US010469626B2

(12) United States Patent
Toledo et al.

(10) Patent No.: US 10,469,626 B2
(45) Date of Patent: *Nov. 5, 2019

(54) SYSTEMS AND METHODS OF ADDRESS BOOK MANAGEMENT

(71) Applicant: Fuze, Inc., Boston, MA (US)

(72) Inventors: Alberto Lopez Toledo, Brooklyn, NY (US); Julio Andres Viera Sotillo, Brooklyn, NY (US); Inaki Berenguer, New York, NY (US); Joaquim Castellà Vilaseca, Brooklyn, NY (US)

(73) Assignee: FUZE, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/012,940

(22) Filed: Jun. 20, 2018

(65) Prior Publication Data

US 2018/0302501 A1 Oct. 18, 2018

Related U.S. Application Data

(63) Continuation of application No. 15/730,349, filed on Oct. 11, 2017, now Pat. No. 10,033,836, which is a
(Continued)

(51) Int. Cl.
*G06F 15/16* (2006.01)
*H04L 29/06* (2006.01)
(Continued)

(52) U.S. Cl.
CPC .......... *H04L 67/42* (2013.01); *G06Q 10/10* (2013.01); *G06Q 10/107* (2013.01); *G06Q 50/01* (2013.01);
(Continued)

(58) Field of Classification Search
CPC . H04L 67/42; H04L 61/1552; H04L 61/1594; G06Q 10/10; G06Q 10/107; G06Q 50/01; H04W 4/16
(Continued)

(56) References Cited

U.S. PATENT DOCUMENTS 8,782,149 B2 * 7/2014 Lester ................. G06Q 10/109
    709/206
8,918,380 B2   12/2014 Sjogren
(Continued)

FOREIGN PATENT DOCUMENTS

| EP | 2450842 | 5/2012 |
|----|---------|--------|
| WO | 2010028194 | 3/2010 |
| WO | 2013056598 | 4/2013 |

OTHER PUBLICATIONS

Van der Patten et al., "Data Fusion Through Statistical Matching," Jan. 2002, MIT Sloan School of Management, Paper 185, 13 pages, retrieved from http://ebusiness.mit.edu/research/papers/185_Gupta_Data_Fusion.pdf.
(Continued)

*Primary Examiner* — Imad Hussain
(74) *Attorney, Agent, or Firm* — McDermott Will & Emery LLP

(57) ABSTRACT

A server comprising a processor circuit and a database may receive address book data comprising information associated with at least one contact from a communication device via a network. The processor circuit may identify information associated with the at least one contact in the database and/or from public data. The processor circuit may add the identified information to the address book data. The processor circuit may store the address book data with the added information in the database and send the added information with or without the address book data to the communication device via the network.

20 Claims, 22 Drawing Sheets

Related U.S. Application Data continuation of application No. 14/570,761, filed on Dec. 15, 2014, now Pat. No. 9,819,768.

(60) Provisional application No. 61/915,959, filed on Dec. 13, 2013.

(51) Int. Cl.
*G06Q 10/10* (2012.01)
*H04W 4/16* (2009.01)
*H04L 29/12* (2006.01)
*G06Q 50/00* (2012.01)

(52) U.S. Cl.
CPC ...... *H04L 61/1552* (2013.01); *H04L 61/1594* (2013.01); *H04W 4/16* (2013.01)

(58) Field of Classification Search
USPC .......................................................... 709/203
See application file for complete search history.

(56) References Cited

U.S. PATENT DOCUMENTS

| | | | |
|---|---|---|---|
| 9,819,768 B2* | 11/2017 | Toledo | H04L 67/42 |
| 9,898,743 B2* | 2/2018 | Bessler | G06Q 10/0631 |
| 2004/0034610 A1 | 2/2004 | De Lacharriere et al. | |
| 2004/0260543 A1* | 12/2004 | Horowitz | G10L 15/193 |
| | | | 704/221 |
| 2009/0171979 A1* | 7/2009 | Lubarski | G06Q 10/10 |
| 2010/0144323 A1* | 6/2010 | Collins | G06Q 10/10 |
| | | | 455/414.1 |
| 2011/0010344 A1 | 1/2011 | Sjoegren | |
| 2011/0119230 A1 | 5/2011 | Zuber | |
| 2011/0125770 A1* | 5/2011 | Battestini | G06Q 10/00 |
| | | | 707/758 |
| 2011/0264627 A1 | 10/2011 | Lee et al. | |
| 2012/0036080 A1 | 2/2012 | Singer et al. | |
| 2012/0096523 A1* | 4/2012 | Ollila | G06Q 10/10 |
| | | | 726/5 |
| 2012/0117036 A1* | 5/2012 | Lester | G06Q 10/109 |
| | | | 707/692 |
| 2012/0150955 A1* | 6/2012 | Tseng | H04L 51/22 |
| | | | 709/204 |
| 2012/0158751 A1 | 6/2012 | Tseng | |
| 2013/0067039 A1* | 3/2013 | Hartzler | G06Q 10/10 |
| | | | 709/219 |
| 2013/0080521 A1* | 3/2013 | Souza | G06Q 50/01 |
| | | | 709/204 |
| 2013/0166555 A1 | 6/2013 | Pfaff | |
| 2013/0290208 A1* | 10/2013 | Bonmassar | G06Q 10/1053 |
| | | | 705/321 |
| 2014/0099930 A1* | 4/2014 | Yu | H04M 1/274516 |
| | | | 455/414.1 |
| 2014/0173403 A1* | 6/2014 | Bastide | G06F 17/246 |
| | | | 715/219 |
| 2015/0012554 A1* | 1/2015 | Midtun | G06Q 10/10 |
| | | | 707/758 |
| 2015/0100356 A1* | 4/2015 | Bessler | G06Q 50/01 |
| | | | 705/7.12 |
| 2015/0134389 A1* | 5/2015 | Punera | G06Q 10/063114 |
| | | | 705/7.15 |
| 2015/0134603 A1* | 5/2015 | Melamed | G06F 11/1453 |
| | | | 707/609 |
| 2015/0310081 A1 | 10/2015 | Baron et al. | |
| 2016/0127379 A1 | 5/2016 | Nayshtut et al. | |

OTHER PUBLICATIONS

International Search Report issued in International Application No. PCT/US2014/070370 dated May 10, 2015.
Written Opinion issued in International Application No. PCT/US2014/070370 dated May 10, 2015.
International Preliminary Report of Patentability issued in International Application No. PCT/US2014/070370 dated Jun. 14, 2016.
Extended European Search Report from European Patent Application No. 14869800.4, dated Aug. 23, 2017, 9 pages.
EP Communication for EP App. No. 14 869 800.4-1213, dated Jun. 25, 2019, 2 pages.

* cited by examiner

550

New Contacts Added | System crowdsources the public information of the new contacts John
GMAIL
Phone: 555-0199
Address: 123 Main St.

⇒

Phone: 555-0199
John Confidence 1
John Smith – Confidence 3

Mike
GMAIL
Phone: 555-2368
Address: 91 Main St.
About: My Boss

⇒

Phone: 555-2368
Mike – Confidence 1

1. Address book is synced with Server

2. Entries belonging with the same contact are linked and synced back with the communication device

1720

This screen displays different updates of the Contacts. Upcoming birthdays, latest status updates, work changes, address changes.

Depending of the type of event, different actions can be taken. For example, on birthdays, a "Happy Birthday" message can be sent to the Contact.

1730

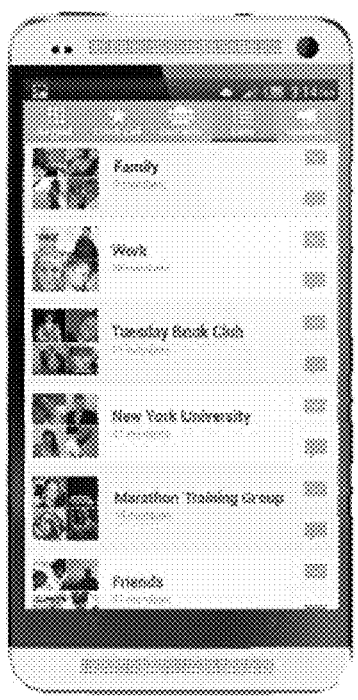

Contactive will automatically group the Contacts in different lists, based on Location, Education, Workplace and other criterias. These criterias to group the Contacts are retrieved from directly from social network, currently Facebook, LinkedIn, Twitter and Google+. In the future more repositories will be added.

For every list, the user can send a SMS or an email to all members of the list.

The user can also manually create more lists than the ones Contactive is going to automatically pre-populate.

Shows the list of Contacts from user. These contacts will be presented with all the available information for each one.

As shown in the picture, Contacts can have information from multiple social networks and Contactive will merge and present them as a single Contact.

This screen also allows to search, add, call and enter to the profile view of a Contact.

1750

SYSTEMS AND METHODS OF ADDRESS BOOK MANAGEMENT

CROSS-REFERENCE TO RELATED APPLICATIONS

This application is a Continuation of U.S. patent application Ser. No. 15/730,349, filed on Oct. 11, 2017, which is a Continuation of U.S. Pat. No. 9,819,768, issued on Nov. 14, 2017, which claims the benefit of priority from the U.S. Provisional Patent Application No. 61/915,959, filed on Dec. 13, 2013. The entire contents of these applications are herein incorporated by reference in its entirety.

BRIEF DESCRIPTION OF THE DRAWINGS

FIG. 12 is a crowdsourcing process according to an embodiment of the invention.

FIGS. 17A-17F are screenshots according to an embodiment of the invention.

DETAILED DESCRIPTION OF SEVERAL EMBODIMENTS

Figure 1:
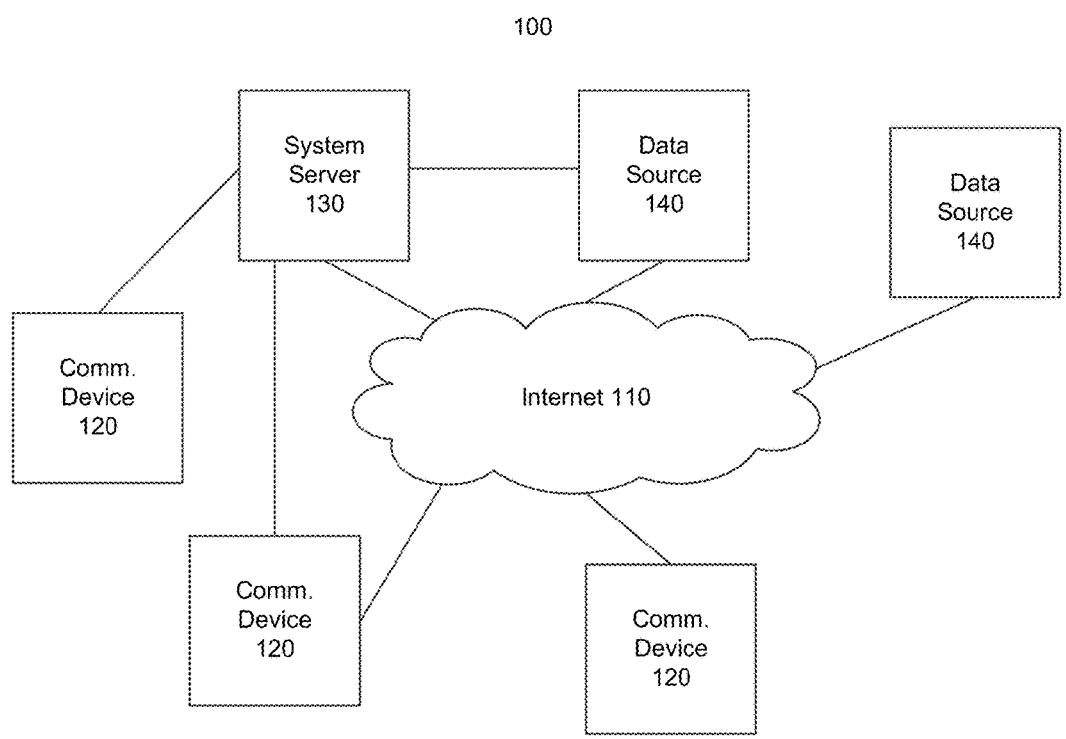
FIG. 1 is a network according to an embodiment of the invention.

Many computer devices, such as personal communication devices, may have phone, email, instant messaging, and other communication capabilities. These devices may use address books to store information about parties with which the user communicates, such as contact and/or biographical information. Systems and methods described herein may create and/or augment the information of an address book with information sent and received using communication networks. The identity of a person or business in an entry of the address book may be resolved, and information contained in the entry or entries of the address book may be augmented from public information sources or from private repositories (e.g. social networks, internal company databases, customer relationship management databases, etc.). The information can be collected in real time or in batches. Additionally, the information collected from one address book can be used to identify entries of another address book by correlating information across them (e.g., by crowdsourcing).

The systems and methods described herein may comprise one or more computers. A computer may be any programmable machine capable of performing arithmetic and/or logical operations. In some embodiments, computers may comprise processors, memories, data storage devices, and/or other commonly known or novel circuits and/or components. These components may be connected physically or through network or wireless links. Computers may also comprise software which may direct the operations of the aforementioned components. Computers may be referred to with terms that are commonly used by those of ordinary skill in the relevant arts, such as servers, PCs, mobile devices, communication devices, and other terms. Computers may facilitate communications between users, may provide databases, may perform analysis and/or transformation of data, and/or perform other functions. It will be understood by those of ordinary skill that those terms used herein are interchangeable, and any computer capable of performing the described functions may be used. For example, though the terms "personal communication device" and "server" may appear in the following specification, the disclosed embodiments may not necessarily be limited to personal communication devices and/or servers.

Computers may be linked to one another via a network or networks. A network may be any plurality of completely or partially interconnected computers wherein some or all of the computers are able to communicate with one another. It will be understood by those of ordinary skill that connections between computers may be wired in some cases (i.e. via Ethernet, coaxial, optical, or other wired connection) or may be wireless (i.e. via Wi-Fi, WiMax, cellular, satellite, or other wireless connection). Connections between computers may use any protocols, including connection oriented protocols such as TCP or connectionless protocols such as UDP. Any connection through which at least two computers may exchange data may be the basis of a network.

FIG. 1 is a network 100 according to an embodiment of the invention. The network 100 may include one or more communication devices 120, such as smartphones, which may communicate with other computers via the Internet 110, cellular networks (not shown), or other communication networks. Each communication device 120 may have an address book, which may include a database containing information about contacts. The network 100 may include one or more system servers 130, which may be used for address book management as described in greater detail below. Communication devices 120 may communicate with the system server 130 via the Internet 110 or some other connection. The network 100 may include one or more data sources 140, which may comprise servers and/or databases. The system server 130 may communicate with the data sources 140 via the Internet 110 or some other connection.

Figure 2:
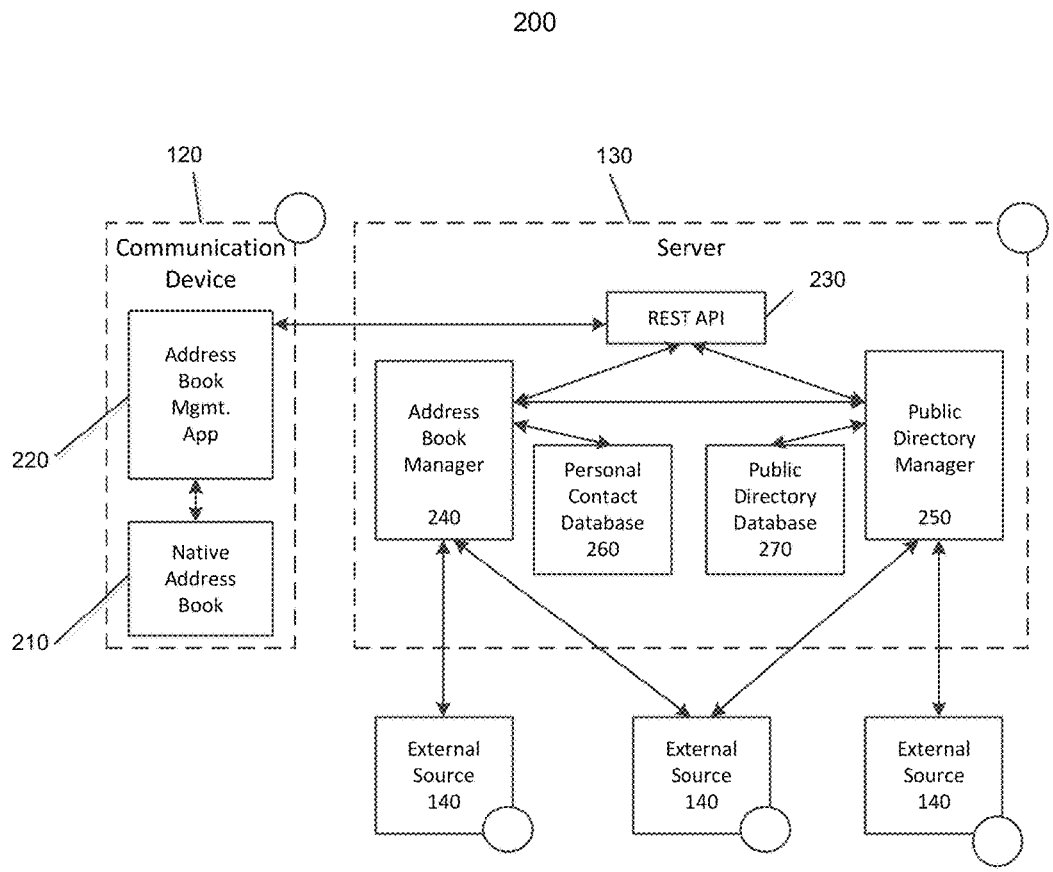
FIG. 2 is an address book management system according to an embodiment of the invention.

FIG. 2 is an address book management system 200 according to an embodiment of the invention. The system 200 may include at least a subset of the devices in the network 100. For example, the system 200 may include a communication device 120, server 130, and external data sources 140. Although the specific network through which the devices communicate is not shown in FIG. 2, the devices in this system 200 may communicate with one another in any way, including via the Internet 110.

Figure 3:
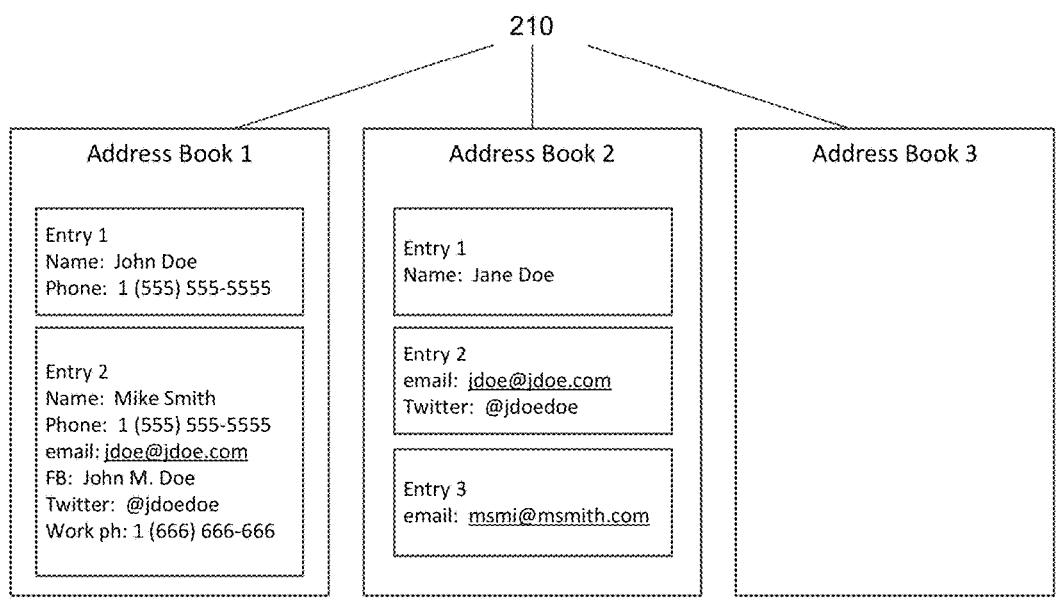
FIG. 3 is a set of address books according to an embodiment of the invention.

The communication device 120 may be, for example, a smartphone including a processor circuit and having the ability to run programs (e.g., smartphone apps such as the native address book 210 and address book management app 220). The address book 210 may be a standard feature of a smartphone, and may retain contact information entered by a user. For example. the address book 210 may include a database or repository where information about individuals is stored. The information in an address book can contain, but is not limited to, any type of identification information such as contact numbers or IDs (e.g., phone numbers, email addresses, IDs from social networks (Facebook, Twitter)), IDs from communication tools (whatsapp, Viber), or any other information related to the user such as notes, activities, tweets, messages, previous calls, etc. The address book may be accessed by other software of the communication device 120. For example a phone application may access the address book to look up a contact's phone number and display information before a call is placed. FIG. 3 is a set of example address books 210. Address books may contain any number of contact entries. Address book 1 contains two entries, address book 2 contains three entries, and address book 3 is empty. Discrepancies may be present across different address books or within a single address book. For example, within address book 1, John Doe and Mike Smith have the same phone number, and contact information which appears to belong to John Doe (e.g., email address jdoe@jdoe.com, Facebook account John M. Doe, and Twitter name @jdoedoe) is associated with Mike Smith. Entry 2 in address book 2 contains contact information which appears to belong to John Doe but is associated with Mike Smith in address book 1, while entry 3 in address book 2 contains contact information which appears to belong to Mike Smith (email address msmi@msmith.com). Also, entry 1 in address book 2 contains the name Jane Doe, which introduces further ambiguity regarding email address jdoe@jdoe.com and Twitter name @jdoedoe.

Returning to FIG. 2, the communication device 120 may also include an address book management app 220. The address book management app 220 may interact with the native address book 210 of the communication device 120 and extract address book data. The address book data may include the entire contents of the address book 210, a subset thereof (e.g., information on specific contacts, phone numbers, email addresses, other identifying information, timestamps, and/or other data contained within the address book 210), and/or other data related to data in the address book 210. The address book management app 220 may establish a two-way contact with the server 130 and cause the communication device 120 to send the extracted address book data to the server 130. The address book management app 220 may receive data from the server 130 as described below, and this data may augment the contact data from the address book 210, for example by updating or replacing obsolete or incorrect information. The received data may include updated and/or augmented contents of the address book 210, a subset thereof (e.g., information on specific contacts, phone numbers, email addresses, other identifying information, timestamps, and/or other data contained within the address book 210), and/or other data related to data in the address book 210 (e.g., tweets or Facebook posts associated with a contact, etc.). The address book management app 220 may also provide caller ID services for the communication device 120 using the data from server 130, information from the address book 210 of the communication device 120, and/or from other public or private directories and may provide a user interface through which contacts can be browsed and calls and/or messages may be sent. This interface may be similar to a native phone application of the communication device 120 in some embodiments.

The server 130 may communicate with the address book management app 220 of the communication device 120 using a representational state transfer application programming interface (REST API) 230. The REST API 230 may expose operations that can be accessed by external entities such as the communication device 120. In some embodiments, the REST API 230 may be the only point of communication providing access to the server 130 via the Internet 110. The address book management app 220 may interact with the REST API 230 to exchange data with the server 130.

The server 130 may include an address book manager 240, which may implement various processes related to management of personal contact information. The address book manager 240 may handle two-way syncing of contacts, merging, and augmenting. The address book manager 240 may also handle communication with external data sources 140 that can provide address book information.

The server 130 may include a personal contact database 260. All contacts for all users may be stored in the personal contact database 260. The personal contact database 260 may include separate, private data for each communication device 120 and/or user accessing the server 130. This may prevent private information from being shared between users so that a user may be unable to read another user's contacts. The contacts may be stored in two different structures, a contact structure and a contact group structure. Contact data may be structured data that represent relevant information for contacting a person or entity. A contact may have a "source" and an "origin". The "origin" is where the contact was originally created and the "source" is the entity that ultimately stored the contact in the system 200. For example, a contact may have Facebook as origin and Android as source. A contact group may be composed from one or more contacts which may come from different sources and/or origins. These contacts may be grouped together because they represent the same person or entity. A contact group may not change or replace the information of a contact, it may only be a link between all of the contacts that belong to a group.

The server 130 may include a public directory manager 250 and public directory database 270. The public directory manager 250 may implement processes related to the public directory database 270. The public directory manager 250 may also handle communication with some external data sources 140 that can provide address book information, such as public data sources 140 holding information about particular contact identifiers (e.g., phone numbers, email addresses, Facebook IDs, Google+IDs, LinkedIn IDs, etc.). The public directory database 270 may store mappings of phone numbers to identities, for example as a table or graph.

Figure 4:
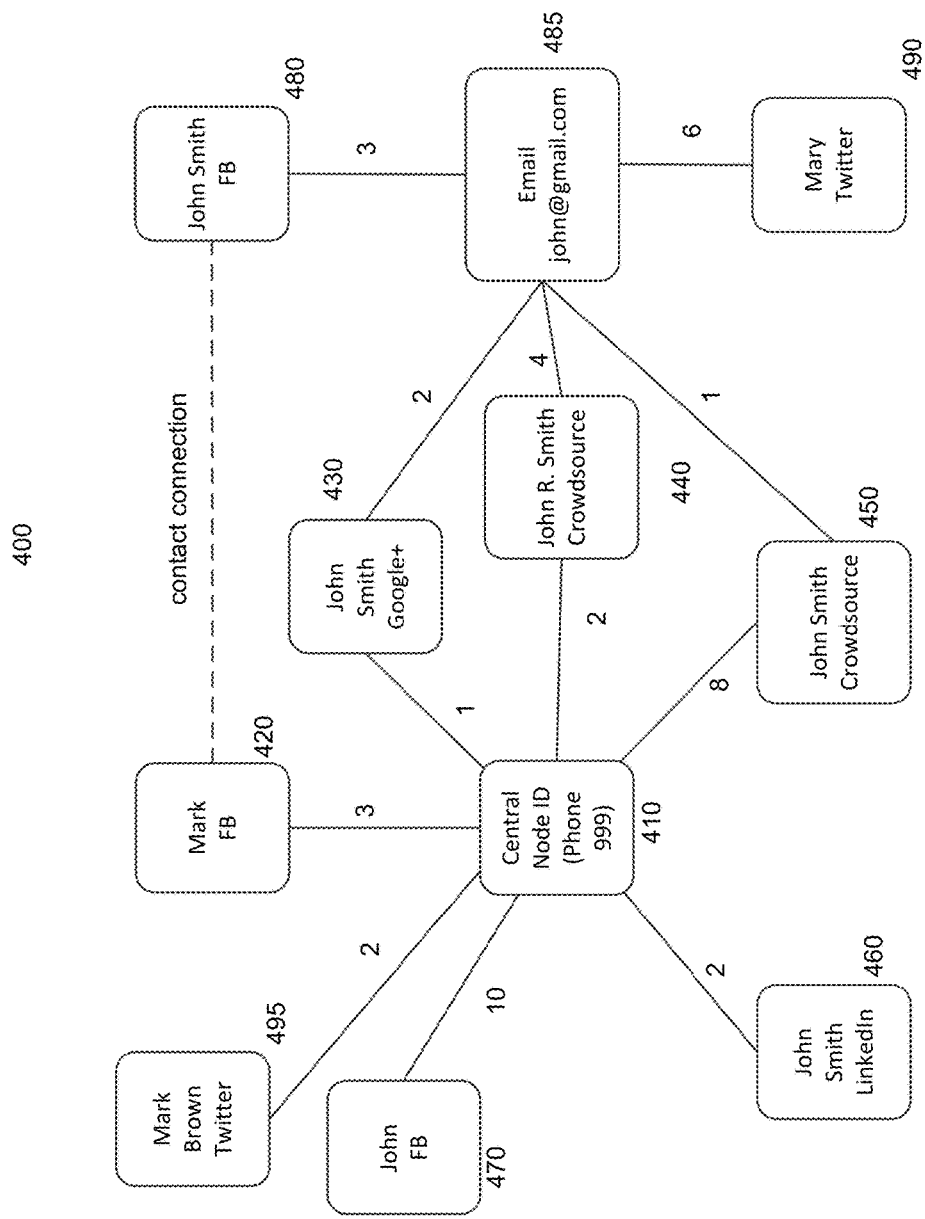
FIG. 4 is an identity graph according to an embodiment of the invention.

FIG. 4 is an identity graph 400 according to an embodiment of the invention. In this example graph 400, for each unique identity identifier, there may be a central node 410 which represents the identifier (e.g., the phone number) itself. This example 400 uses a phone number as the central node 410, but other contact identifiers may be used as the central node 410. One or more nodes (in this example, the seven nodes 420, 430, 440, 450, 460, 470, and 495) may be linked to the central node 410. The linked nodes 420, 430, 440, 450, 460, 470, and 495 may represent possible identities. For example, the linked nodes 420-470 may include Facebook profiles 420, 470, Google+ profiles 430, LinkedIn profiles 460, crowdsourced information 440, 450, Twitter profiles 495, and/or other types of information. Each vertex in the graph may have a confidence value (e.g., 3 for node 420, 1 for node 430, 2 for node 440, 8 for node 450, 2 for node 460, 10 for node 470, and 2 for node 495). The higher the confidence is between the central node 410 and the identity node 420, 430, 440, 450, 460, 470, and 495, the more the system 200 can assure they are linked together. The confidence may be determined using at least two different strategies. If the node was created as a consequence of a user contact, for example, uploading contacts, crowdsourcing, or merging, the public directory manager 250 may count how many different users contributed to create the node. The resulting number may be the confidence. If the node was created as a result of importing it from an external source (Google Places, Yelp, etc.), the confidence may be a preset number assigned to the source. For example, all nodes retrieved from Google Places may be assigned a confidence level of 10 by default.

The identity graph 400 may be used to query a unique identity identifier (e.g., the phone number of central node 410) to find identities (e.g., nodes 420, 430, 440, 450, 460, 470, and 495) associated with it. Those nodes that are found through such a query may be further linked to other nodes through relation edges. For example, the John Smith Google+ node 430, the John R. Smith crowdsource node 440, and the John Smith crowdsource node 450 are all linked to a node for an email address: john@gmail.com 485. The links may have confidence values. The linked node 485 may in turn be further linked to additional nodes, e.g. John Smith Facebook 480 and Mary Twitter 490, and these further links may also have confidence values. Relation edges between contacts may also be provided to represent their connections in networks like Facebook, Linkedin, or Twitter. For example, a contact connection may be found between the node for Mark Facebook and John Smith Facebook, which may indicate that Mark and John Smith are Facebook friends.

Returning to FIG. 2, the server 130 may interact with one or more external data sources 140. An external data source 140 may be any external entity that can provide contact information, for example Facebook, Google Places, Linkedln, Google+, etc. Private repositories that require credential access such as the ones present in enterprise CRM (customer relationship management) systems (e.g. Microsoft Active Directory, Sales Force, etc.) may also serve as external data sources 140. External data sources 140 may include personal contact sources and/or public contact sources. A personal contact source may provide contacts that are private to a particular user. Personal contact sources may be authorized by a user of the system 200 on the source itself. Data obtained from personal contact sources may only be presented to the user that owns the source credentials. Public contact sources may provide publicly available information. Since the identities on public contact sources are not directly related to a particular system 200 user, the system 200 may use them to augment the existing contacts of the users and/or to perform caller ID resolution. Google Places and Yelp are examples of public contact sources.

Figure 5:
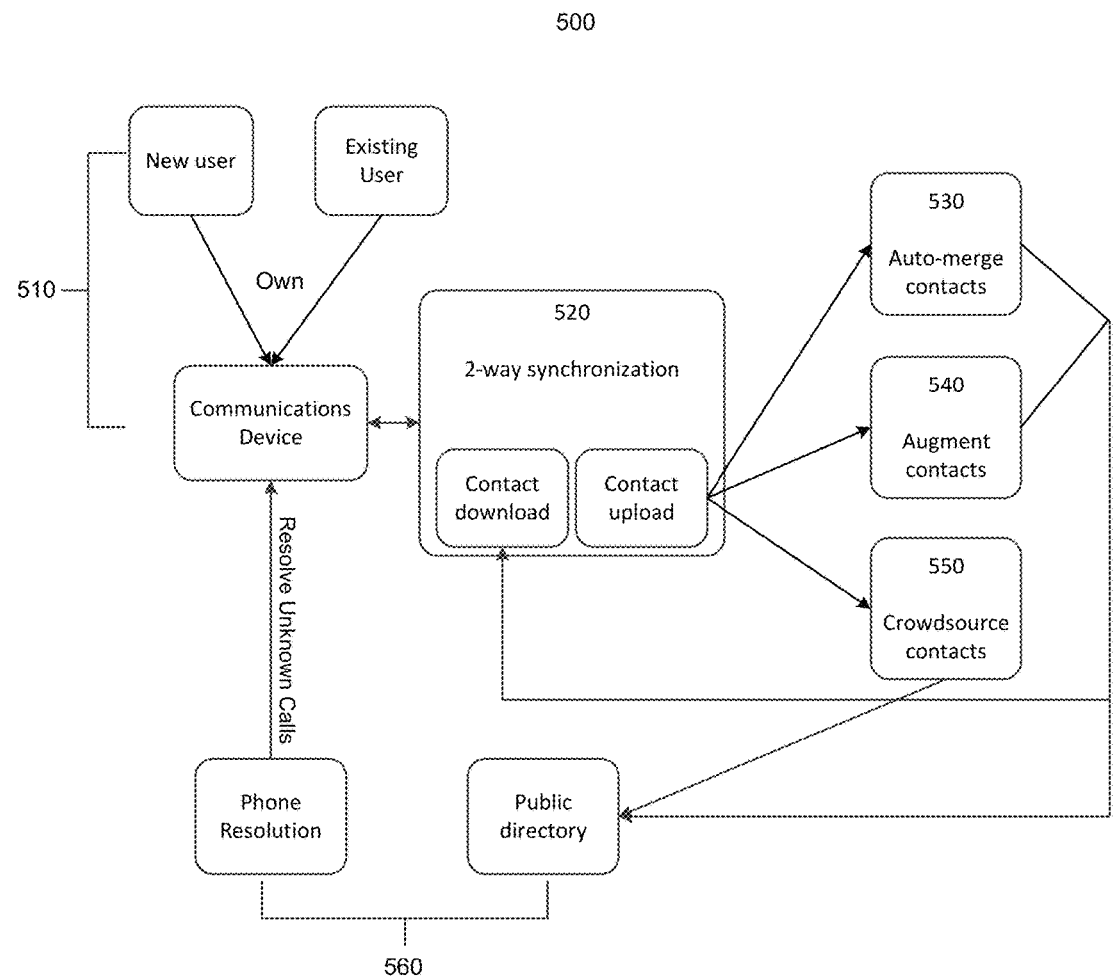
FIG. 5 is an address book management process according to an embodiment of the invention.

FIG. 5 is an address book management process 500, which may be performed by the system 200, according to an embodiment of the invention. The address book management app 220 of the communication device 120 may be activated 510. This may include installing and/or registering with the address book management app 220 for a new user. For existing users, this may include accessing the address book management app 220 via a communication device 120 user interface, or the address book management app 220 may be activated automatically (e.g., on communication device 120 startup or with an attempt to access the native address book 210). A user may have an account with the system 200, so that the user's address book information can be accessed on a plurality of communication devices 120 associated with that user. The address book management app 220 and server 130 may perform synchronization 520, wherein the communication device 120 may upload contact data to and/or download contact data from the server 130. Contacts may be merged 530, augmented 540, and/or crowdsourced 550 by the server 130. These actions may be done as part of the synchronization 520 so that data downloaded by the communication device 120 has been merged, augmented, and/or updated via crowdsourcing. These actions may also be done periodically by the server 130. The system 200 may also perform phone resolution 560, for example to provide caller ID data for unknown contacts. Merged, augmented, and/or crowdsource updated contact information may be added to the public directory to help facilitate this phone number resolution 560.

Figure 6:
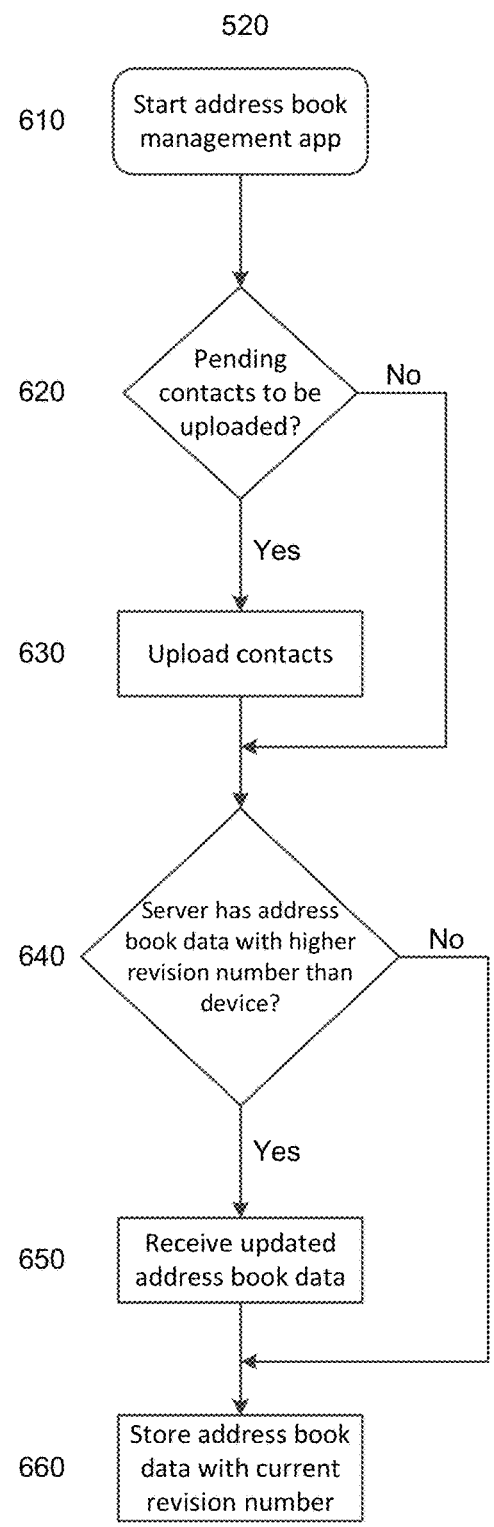
FIG. 6 is a synchronization process according to an embodiment of the invention.

FIG. 6 is a synchronization process 520 according to an embodiment of the invention. The synchronization process 520 may allow information to be updated within the communication device 120 and the server 130. The two-way synchronization process 520 may be based on "revisions". Each address book may have a revision number, which may be incremented every time there is a change on any of the contacts it holds. Also, each change may be associated with a corresponding revision number. Upon startup of the address book management app 220, the address book management app 220 may contact the REST API 230 to begin the process 610. The address book management app 220 may check whether there are any pending contacts to upload 620. Contacts with revision numbers that have increased since the last time the synchronization process 520 was performed may be pending contacts to upload. If there are any pending contacts to upload available, the address book management app 220 may cause the communication device 120 to send them to the server 130 via the REST API 230, which may receive the updates 630. After upload, or if there were no contacts to upload, the address book manager 240 and/or public directory manager 250 may determine whether there are any address book updates on the server 130 side 640. If the server 130 has received entry updates from external sources 140 and advanced the associated revision number since the most recent synchronization 520 with the communication device 120, there may be updates available for download. In this case, the REST API 230 may cause the server 130 to send the updates to the communication device 120 via the address book management app 220, which may receive the updates 650. When there are no more changes to be made by the address book management app 220, either because updates have been received 650 or no updates were available, the address book data on the communication device 120 may be saved with the most recent revision number marked as current 660.

When a contact is uploaded, the server 130 may apply enhancements to the contact. These enhancements may include merging 530, augmenting 540, and/or crowdsourcing 550, which are described in greater detail below. The enhancements may not alter the original information uploaded from the communication device 120. Therefore, whether enhancements are to be applied or not, the upload process from the communication device 120 to the server 130 may be similar.

Figure 7:
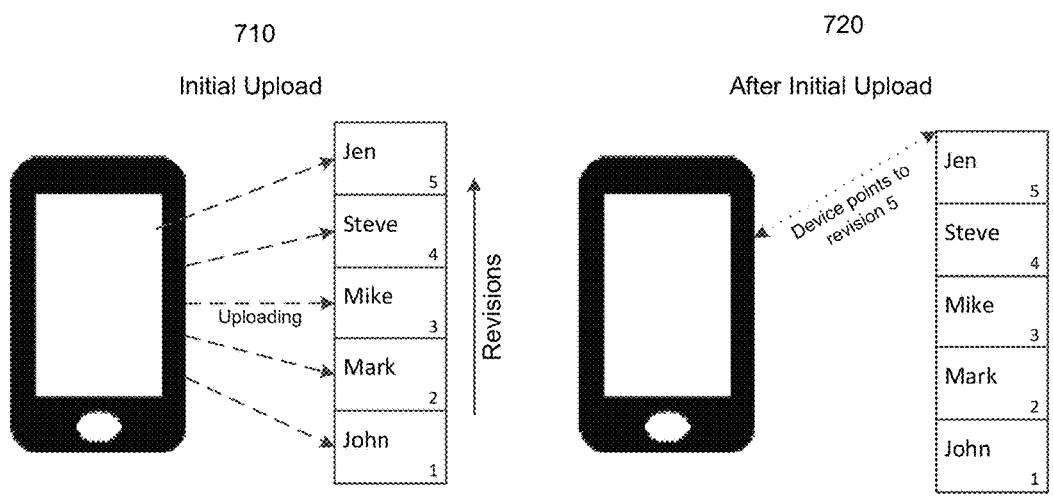
FIG. 7 is a data upload according to an embodiment of the invention.

FIG. 7 is a data upload according to an embodiment of the invention. The first time a user signs in to the address book management app 220, all of the contacts from the native address book 210 may be uploaded in an initial upload 710. In the initial upload 710, contacts may be piled on top of each other and stamped with a revision number. After the initial upload 710 has been completed, the address book management app 220 may store the highest revision number as the current revision 720 in a memory of the communication device 120. For example, in FIG. 7, the revision number 5 is stored as current 720.

Figure 8:
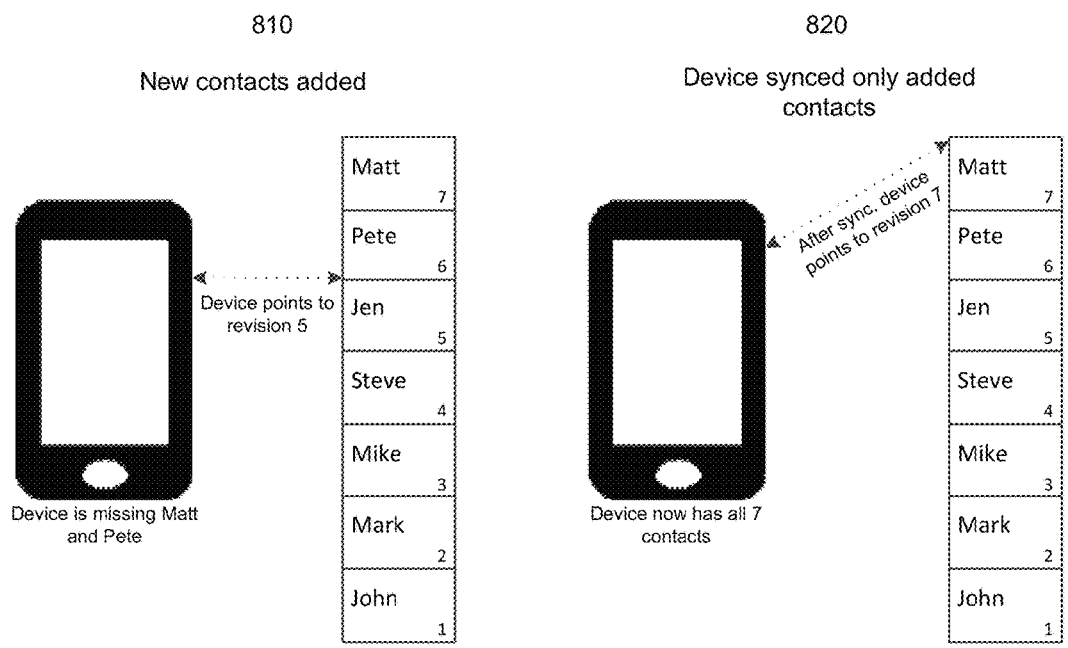
FIG. 8 is a data change according to an embodiment of the invention.

FIG. 8 is a data change according to an embodiment of the invention. If there any new contacts added to the address book 810, the new contacts may be stamped with new revisions. Also, modifications of existing contacts may be stamped with new revisions. Thus, after the initial upload, the address book management app 220 may download only the latest changes to an address book 820 (i.e., those with revisions higher than the current revision), avoiding full sync of contacts. The following figure shows what happens when new contacts are added. This synchronization may allow any change to any contact on any device 120 associated with a given user to be automatically propagated to all the devices 120 associated with the user. Although contacts are sorted based on revisions in these examples, the system 200 may also index them by name, origin, source, phone number count, etc.

Figure 9:
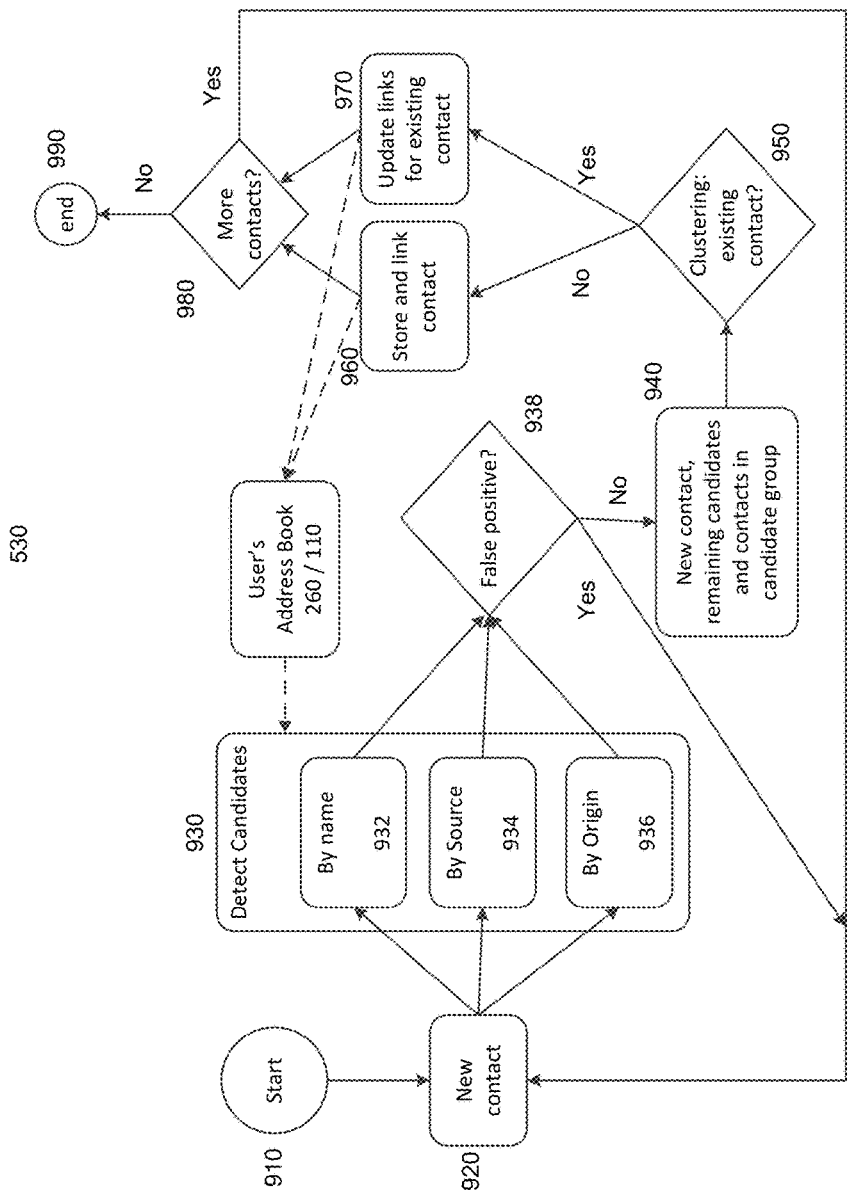
FIG. 9 is a merge process according to an embodiment of the invention.

During the address book management process 500, contact data may be merged. FIG. 9 is a merge process 530 according to an embodiment of the invention. The merge process 530 may link different contacts into the same group without user intervention. This may remove duplicate entries from address books and may link contacts that represent the same identity in the same group to provide a more complete representation of a candidate and a more comprehensive list of contacts. The merge process 530 may begin 910 when one or more contacts are uploaded as part of the synchronization process 520. Each new contact may be selected 920, and a list of candidates among the existing contacts in the personal contact database 260 may be selected 930. The candidates may be selected by name 932, by source 934, and/or by origin 936. In selecting by name 932, if the new contact has the same name as an existing contact or a similar pronunciation, the matching existing contact may be considered a candidate. The name matching may be case-insensitive and may ignore accents and special characters, but name matching may otherwise look for exact matches or matches with similar pronunciations. The pronunciation-based name matching may be done by normalizing names, creating a phonetic representation of each normalized name, and matching based on the phonetic representations In selecting by source 934, if the new contact has the same source and the same ID on that source as an existing contact, the matching existing contact may be considered a candidate. In selecting by origin 936, if the new contact has the same origin and the same ID on that origin as an existing contact, the matching existing contact may be considered a candidate. Each selected candidate may be compared with the new contact and candidate matches may be determined. In some embodiments, no additional comparison may be performed. In these cases, the selection by name 932, by source 934, and/or by origin 936 may suffice to identify a match. In other embodiments, additional checks may be performed. For example, once a first set of candidates is obtained, each candidate in the set may be compared with the contact again to identify and discard false positives that clearly do not represent the same identity as the uploaded contact 938. The comparison may be done by a machine learning classifier which may use the information available in the candidate and the uploaded contact (e.g., name, birth date, location, network connections, etc.) and output a probability that both contacts represent the same entity. Candidates below a probability threshold may be discarded as false positives. Once a set of matches is identified 940, the uploaded contact and the matching candidates may be reorganized into a group 950. This may link the identified contacts and reorganize any existing groups utilizing the new information provided by the new contact. The reorganization may be done by a clustering algorithm which may use a distance function to group contacts within some distance threshold to one another. If the new contact is not already in the system, the new contact may be stored and linked to the group of related contacts 960 identified by the clustering algorithm. If the new contact is already stored, the links between existing contacts may be updated according to the clustering 970. If there are more new contacts to analyze 980, the next contact may be selected 920, and the process may repeat. If there are no more contacts to analyze 980, the merge process 530 may end 990. Thus, any changes may be written to the address book and automatically propagated to the public directory and to all the user devices 120 via the two-way synchronization 520.

Figure 10:
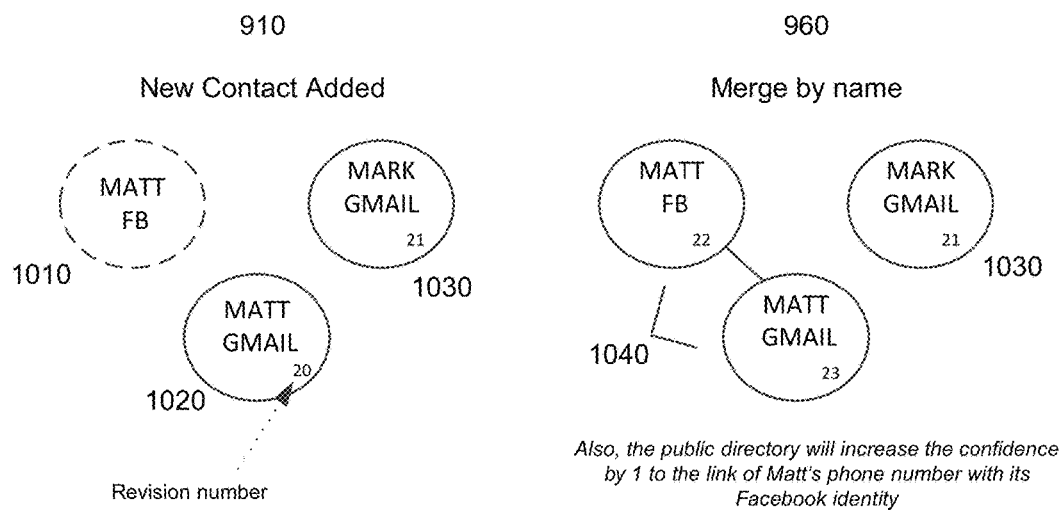
FIG. 10 is a data merge according to an embodiment of the invention.

FIG. 10 is a data merge according to an embodiment of the invention. A new contact is identified 910. In this example, the new contact is Matt's Facebook ID 1010. The personal contact database 260 already contains other contacts, including Matt's Gmail address 1020 and Mark's Gmail address 1030. The merge process 530 may proceed as described above, and it may be determined that Matt's Facebook ID 1010 and Matt's Gmail address 1020 are associated with the same contact (Matt). Thus, a merged contact for Matt 1040 may be stored 960. The merged contact 1040 may receive an updated revision number. The merged contact 1040 may also receive an increased confidence level compared to the contact 1020 already stored in the database 260. Through a user interface provided by the address book management app 220 on the communication device 120, a user may be able to manually un-merge contacts. If a set of merged contacts is unmerged, the system 200 may remember this action so the contacts are not merged again.

Figure 11:
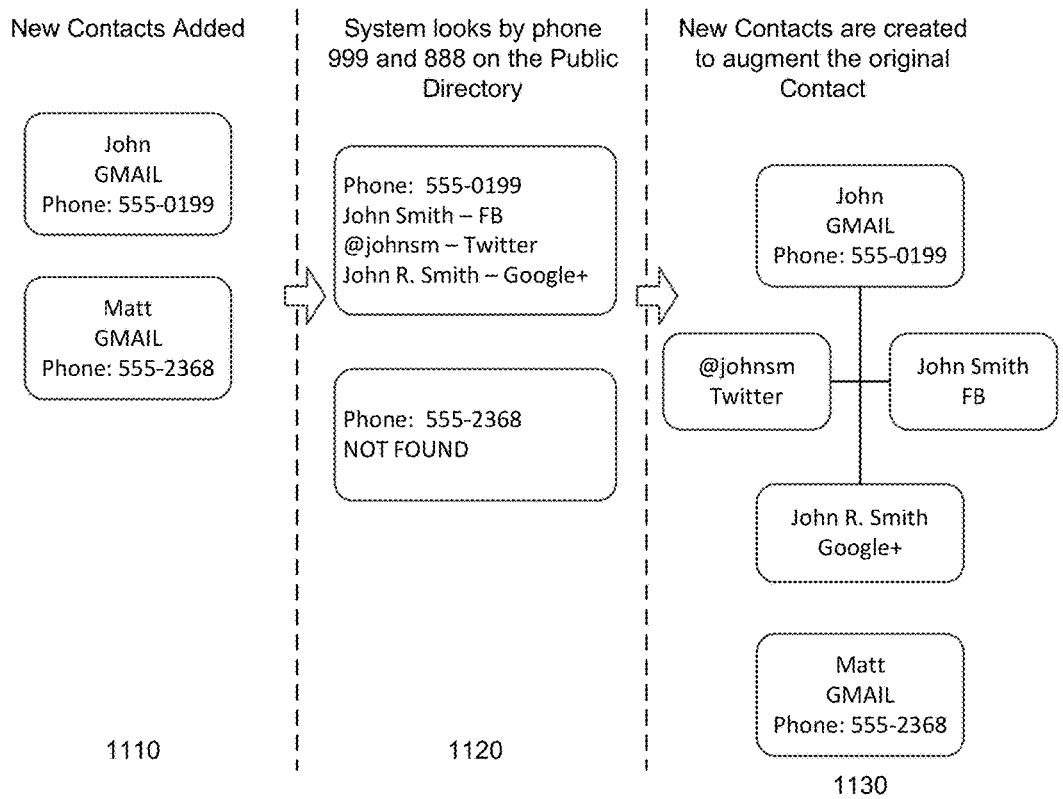
FIG. 11 is an augmenting process according to an embodiment of the invention.

During the address book management process 500, contact data may be augmented. FIG. 11 is an augmentation process 540 according to an embodiment of the invention. Contacts that are uploaded during the synchronization process 520 may be subjected to public directory augmentation 540. New contacts may be received 1110, and a query of all the contact identifiers of a specified type (e.g., phone numbers in FIG. 11) associated with the new contacts on the public directory may be performed 1120. The query may be done with high precision parameters to avoid false positives. If the query returns valid data for a new contact, the new contact may be stored in the personal contact database 260 and associated with the contact group to which the query data belongs 1130. For example, in FIG. 11 two new contacts are received, one for John with phone number 555-0199 and one for Matt with phone number 555-2368. A match is found for 555-0199, and no match is found for 555-2368. Because the query returned valid data for John, the uploaded data is used to augment the contact group that already exists for John. The new contact for Matt returned no query results associated with any preexisting contact, so Matt's contact data may be stored but is not associated with any existing contact group. If there are several contacts with the same information (e.g., the same phone number or email address) in the address book, the augmented contacts may be linked to the nearest matching contact group, for example through the use of the clustering algorithm described above with respect to FIG. 9. A contact generated from the augmentation process 540 may not be used in to the merging process 530 except by origin 936 candidate match. Additionally, augmented contacts from the user may be re-checked periodically (e.g., every 24 hours) to confirm that the augmented contacts still comply with the public directory information. If an augmented contact does not comply with the public directory information, the augmented data may be removed from the contact group. The augmentation changes may be automatically propagated to user communication devices 120 via the two-way synchronization 520.

During the address book management process 500, contact data may be crowdsourced. FIG. 12 is a crowdsourcing process 550 according to an embodiment of the invention. Contacts that are uploaded during the synchronization process 520 may be enhanced with crowdsourcing 550. New contacts may be received 1210, and public information of the new contacts may be obtained via crowdsourcing 1220, for example by searching information in the public directory database 270 that originally came from external sources 140. This search may identify previous entries for a name-contact identifier (e.g., name-phone or name-email) combination. In this case, the confidence of that link may be increased. Name matching may be case insensitive and accents, commas, and other special characters may be removed. Crowdsourcing 550 may only search names and contact identifiers (e.g., phone numbers or emails in FIG. 12) of the contacts in some embodiments, and other information (e.g., address, pictures, "about", etc.) may remain private inside the user's address book. Also, some embodiments may include a blacklist of words to ignore in crowdsourcing 550 (for example, 1500 inappropriate words in 10 different languages). For example, in FIG. 12 two new contacts are received, one for John and one for Mike. The public directory database 270 is searched, and matches are found for both contacts. The phone number associated with John in the new contact is also associated with two entries in the public directory database 270, one for John and another for John Smith. The contact may be stored as John Smith, because that entry has a higher confidence value within the public directory database 270.

Figure 13:
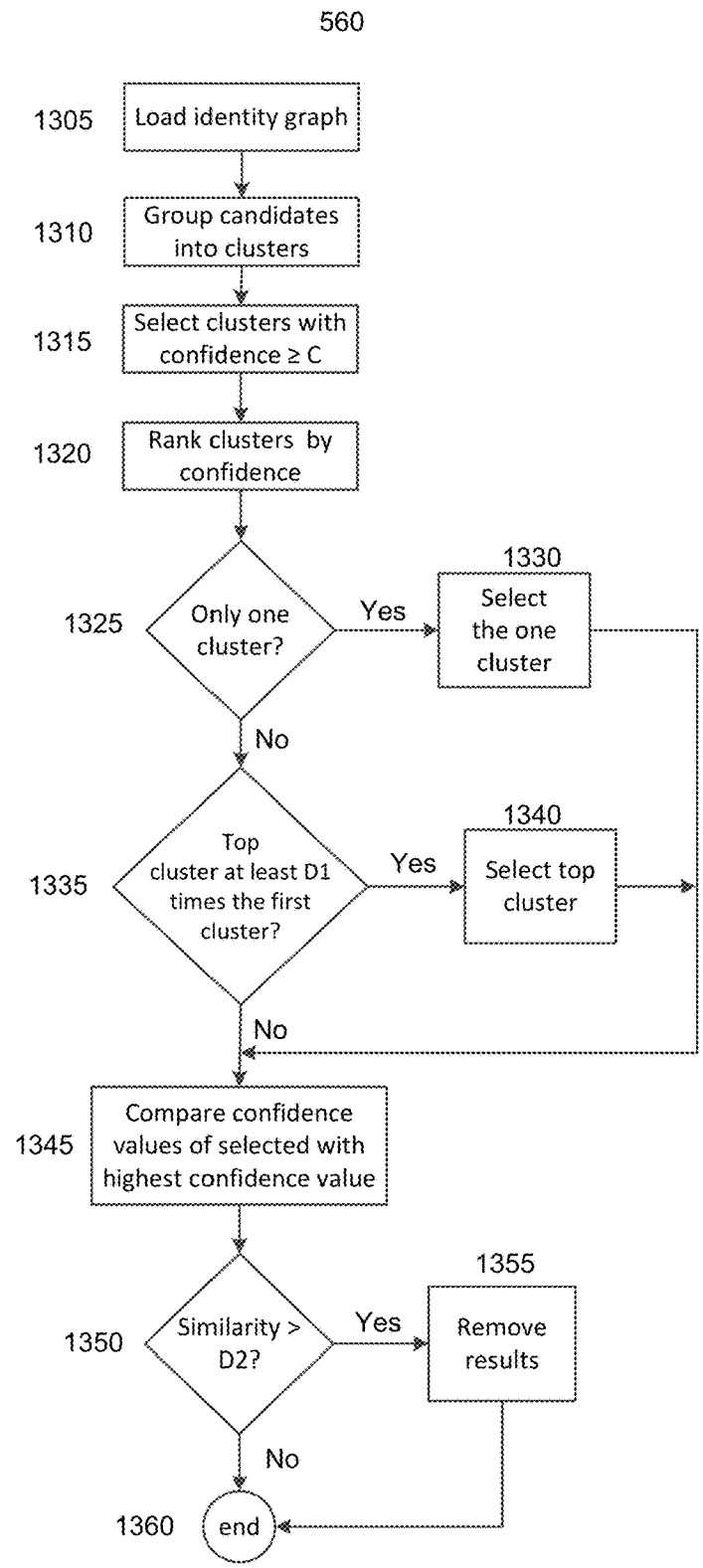
FIG. 13 is a phone number resolution process according to an embodiment of the invention.

The system 200 may also perform contact identifier resolution 560. FIG. 13 is a phone number resolution process 560 according to an embodiment of the invention. First, an identity graph (e.g., graph 400 of FIG. 4) for a particular contact identifier (e.g., a phone number in FIG. 13) may be loaded 1305. The candidates may be grouped into clusters of similar contacts 1310, as discussed above with respect to FIG. 9, for example. The confidence of each cluster may be computed by adding the confidence of the contacts within the cluster. Clusters with confidence greater or equal than a confidence C may be selected 1315. For the present example, C=2, although other values may be possible. The selected clusters may be ranked by confidence 1320, for example in descending order. If there is only one cluster in the origin 1325, it may be selected 1330. If there are multiple clusters 1315, a cluster with highest confidence may be selected 1340. For example, clusters with the highest confidences may be taken, and other clusters may be discarded. The threshold to discard may be parameterized by D1, which may be a percentage of the highest confidence. For the present example, D1=75%, although other values may be possible. Table 1 applies this selection to the graph 400 of FIG. 4, with selected entries marked in bold caps.

TABLE 1

| Cluster 1: "Johns" | Cluster 2: "Marks" | Cluster 3: "Marys" |
|---|---|---|
| John Smith - Linkedin: 2<br>John Smith - Facebook: 8<br>John R. Smith - crowdsource: 2 | Mark - Facebook: 3<br>Mark Brown - Twitter: 2 | Mary - Facebook: 3 |
| Total Confidence = 12 | Total Confidence = 5 | Total Confidence = 3 |

In this example, all contacts in clusters with confidence greater than 9 may be kept (75% of 12=9), so only the contacts in cluster 1 may be kept.

Once results are determined, a final pass may be performed, comparing the confidence value of each entry with the highest confidence 1345. If the similarity between the confidence value of each entry and the highest confidence is more than D2 1350, then the results may be removed from the response 1355. Similarly, if there are several contacts with the same origin (e.g, Facebook, Twitter, Linkedin, etc.), only the one with the highest confidence may be retained, and the others may be removed. For the present example, D2=30%, although other values may be possible. Table 2 applies this selection to the graph 400 of FIG. 4, with selected entries marked in bold caps. As shown in the example of Table 2, the similarity between confidence values may be expressed as a distance, where the distance is a fraction or percentage formed by dividing the highest confidence by the confidence for an entry. For example, in Table 2, the result "John Smith—Facebook" has the highest confidence, and its distance is 8/8 (its own confidence over the highest confidence) or 100%. The result "John Smith Linkedin" has a confidence of 2, and its distance is 2/8 or 25%.

TABLE 2

| Result | Confidence | Distance |
|---|---|---|
| JOHN SMITH - FACEBOOK | 8 | 100% |
| John Smith - Linkedin | 2 | 25% |
| John R. Smith - crowdsourced | 2 | 25% |

C, D1, and D2 may be fully parametrized. Depending on the use case they may be tuned for more precision or more results. For example, for caller ID purposes, the parameters may be set to low precision so more results are returned. For address book augmentation purposes, the parameters may be set to have more precision.

Figure 14:
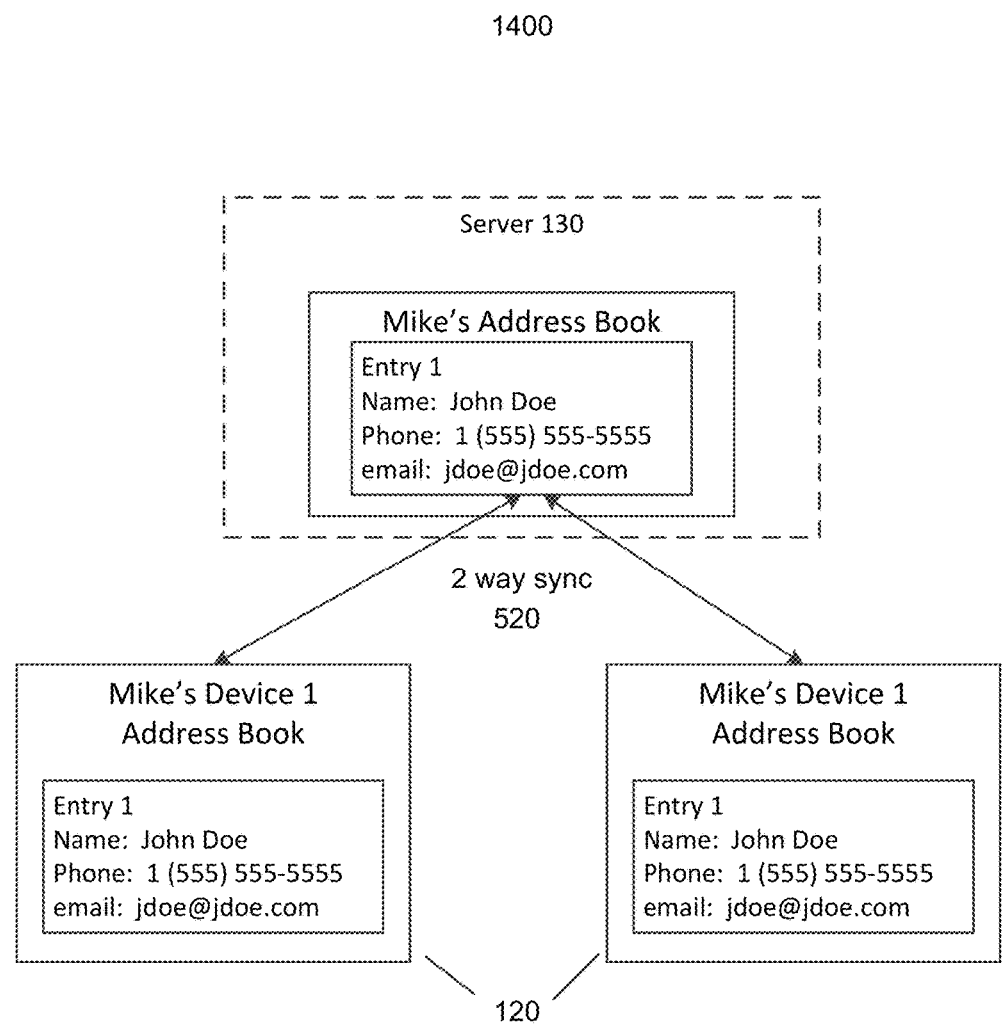
FIG. 14 is an address book backup and restore example according to an embodiment of the invention.
Figure 15:
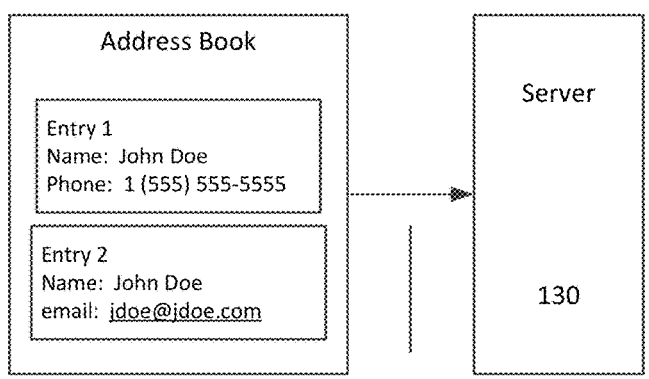
FIG. 15 is an address book organization example according to an embodiment of the invention.
Figure 15:
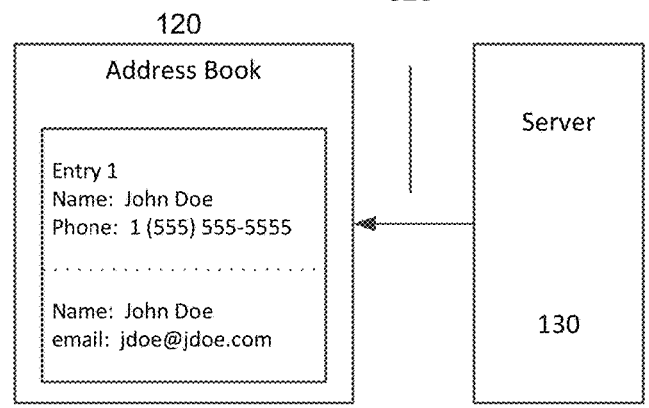
Figure 16:
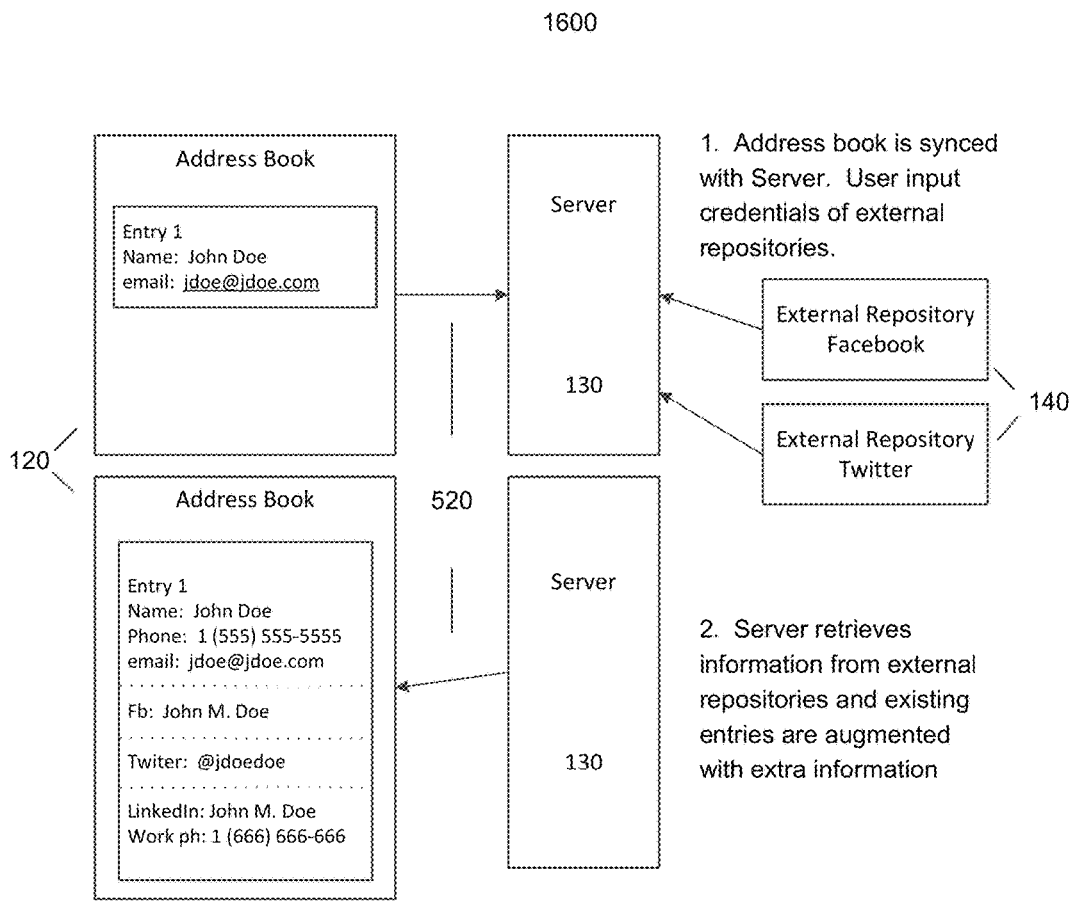
FIG. 16 is an augmentation example according to an embodiment of the invention.
Figure 17A:
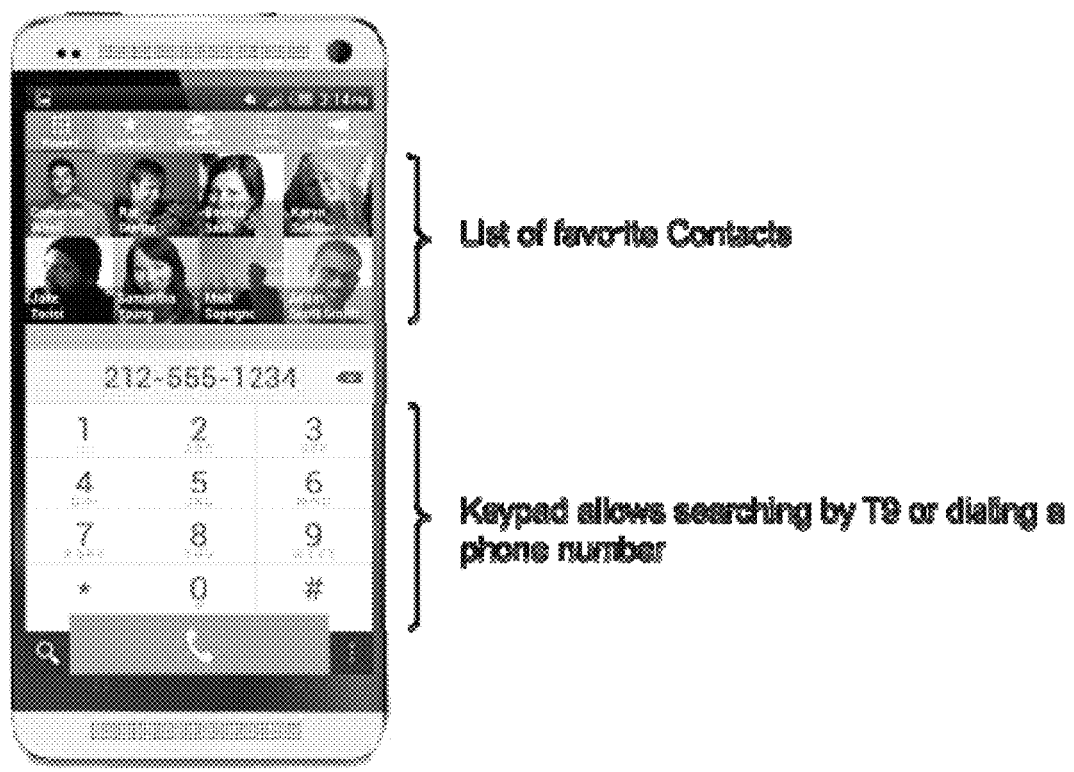
Figure 17B:
Figure 17C:
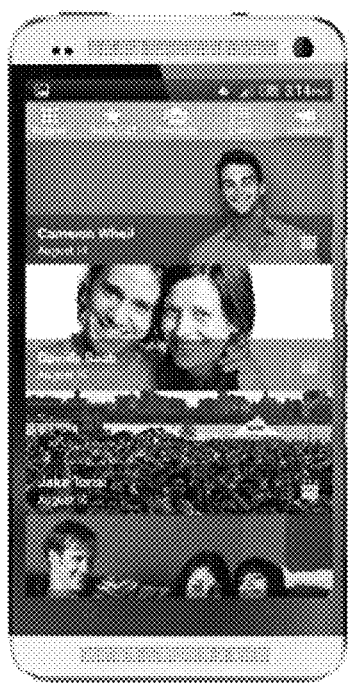
Figure 17E:
Figure 17F:

FIGS. 14-16 present use cases consistent with the systems and methods described herein.

FIG. 14 is an address book backup and restore example 1400 according to an embodiment of the invention. The server 130 may maintain a backup of the address book of a communication device 120 and restore the address book on demand. This may be useful in the event of a user losing their personal communication device 120, so the address book can be restored in a new device 120. Also, this may be useful for porting an existing address book to a new type of device 120, for example when the user purchases a new phone and wants to transfer the existing address book to a new system (e.g. from Apple iPhone to Google Android). Due to the synchronization process 520, which may be always active, the user may always have the latest address book on any communication device 120 with the address book management app 220. As discussed above, when the address book management app 220 is installed on a communication device 120 or when changes to contacts are made, contacts from the native address book 210 may be uploaded to the server 130 during synchronization 520 and stored in the personal contact database 260. Any change by the user or server 130, or any new contact added, may be automatically propagated to all user communication devices 120 during synchronization 520.

FIG. 15 is an address book organization example 1500 according to an embodiment of the invention. Native address books 210 present in communication devices 120 may typically be manually maintained by users. This may result in duplicate entries, errors (e.g., typos), and/or fragmentation of entries (e.g., one entry for John Doe has a work phone number and another entry for John Doe has a personal mobile phone number). As described above, the server 130 may receive the flawed entries during synchronization 520 and identify entries belonging to the same individuals via pattern matching using information such as name, phone numbers, social network identities, etc. to merge the separate entries into one consolidated entry, which may be returned to the communication device 120 during synchronization 520. The organization may happen on the server 130 side, therefore any change to the user's address book may be propagated to all user communication devices 120 during synchronization 520.

FIG. 16 is an augmentation example 1600 according to an embodiment of the invention. Native address books 210 present in communication devices 120 may typically be manually maintained by users. This may result in duplicate entries, errors (e.g., typos), and/or fragmentation of entries (e.g., one entry for John Doe has a work phone number and another entry for John Doe has a personal mobile phone number). As described above, the server 130 may search in public repositories 140 and use the user credentials in private repositories 140 (e.g. linkedIn, Facebook, Twitter, etc.) to search information from existing entries in the address book and augment this information with new data or correct existing data. The augmentation may happen on the server 130 side, therefore any change to the user's address book may be propagated to all user communication devices 120 during synchronization 520.

The systems and methods described herein may also be applied to an enterprise environment, where the devices 120 may not only querying for users in the public directory database 270, but also in the company's directories. Examples of company directories may include Salesforce.com and Microsoft CRM. The system 200 may operate in an enterprise mode wherein employees may access information within the CRMs and identify not only co-workers, but also clients, contractors, and/or any other information contained in the company databases. For the system 200 to serve enterprise users, users may need to have credentials for the enterprise CRMs, and many times credentials may require other methods of authentication such as VPN (virtual private network) access. The information from company sources may be treated as private and may not go to any public directory to prevent unauthorized access.

FIGS. 17A-17F are screenshots 1710-1770 according to an embodiment of the invention. These screens may be generated by the address book management app 220 and displayed on the display of a communication device 120.

Screen 1710 shows an interface that may allow the user to view and call favorite contacts. The interface may allow a user to search a for a contact, for example by using T9 typing. Additionally, a standard keypad may be included that supports typing and calling any phone number Screen 1720 shows an interface that may allow pictures of a contact, which may have been retrieved from various sources, to be displayed. Different ways of communicating with the contact (e.g., Facebook, Twitter, phone, email, SMS, etc.) may be selectable, and clicking on a link associated with each way may open communication with the contact in the associated application. Also, information for the contact may be displayed, such as latest interactions, biographical information, status updates, etc.

Screen 1730 shows an interface that may display updates by or about the contacts. For example, upcoming birthdays, status updates, information changes, etc. may be shown. Some updates may include links enabling user action. For example, if a contact has an upcoming birthday displayed, the user may be able to click a link to send a "happy birthday" message to the contact.

Screen 1740 shows an interface that may display contacts grouped into lists. For example, contacts may be grouped by location, education, workplace, etc. Criteria for grouping contacts may be retrieved from external sources 140 (e.g., social networks such as Facebook, LinkedIn, Twitter, Google+, etc.). Users may be able to send messages to every contact in a group. Users may also be able to manually create and/or edit groups.

Screen 1750 shows an interface that may show a list of contacts. Contacts may be displayed with the information available for each contact (i.e., the information provided from the server 130 during the most recent synchronization 520 as described above). This interface may allow a user to search, add, view, contact, etc. any of the contacts in the list.

Screens 1760 and 1770 show a caller ID interface. Some communication devices 120 (e.g., those using the Android operating system) may not allow a full replacement of a native incoming call or In-Call screen. However, information may be displayable on top of the native screens. The address book management app 220 may use this feature to enhance the calling experience for the user by showing extended information for a number that is calling the communication device 120. The address book management app 220 may identify all the incoming and outgoing calls of the communication device 120. When an incoming or outgoing call takes place, the address book management app 220 may first display local information to provide caller ID information to the user, and then the address book management app 220 may query the server 130 to augment this information with any other data contained in the public directory database 270, if any such data exists. After the call, the address book management app 220 may update the local directory directly, or it may prompt the user to store new information locally for further reference. As shown in 1760 and 1770, the address book management app 220 may display the caller ID information on a window that may appear on top of a native incoming call screen. This window may be positioned so that it does not interfere with the native answer or decline buttons. The caller ID screen may be divided into two sections. A main section (shown in 1760) may display the contact's picture, name, phone, location, work, and/or the most recent interaction with that contact. The user may be able to swipe the screen or otherwise interact with the communication device 120 and thereby cause an extended section (shown in 1770) to be displayed. The extended section may display different types of information for the contact. It may contain, but is not limited to, latest interactions (SMS, email, call, etc.), work and education information, last status updates, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, while the above examples are presented in the context of communication devices 120 and servers 130, it will be understood that the systems and methods described herein can be performed by any interconnected computers. Thus, the present embodiments should not be limited by any of the above-described embodiments.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A method comprising:
    receiving, by a server from a communication device, address book data comprising a received contact associated with a contact identifier;
    retrieving, from a database, stored address book data comprising information associated with the received contact;
    when only one contact associated with the contact identifier is identifiable from the stored address book data, then adding a merged contact comprising the received contact and the only one contact to the stored address book data, and sending, by the server to the communication device, at least some information for the merged contact; and
    when two or more contacts associated with the contact identifier are identifiable from the stored address book data, then sending, by the server to the communication device, at least some of the information associated with one of the two or more contacts having a highest confidence value,
    wherein when a respective contact was created by a user or imported from an external source, the confidence value for the respective contact is generated based on whether the contact was created by the user, or imported from the external source.

2. The method of claim 1, wherein when the two or more contacts associated with the contact identifier are identifiable from the stored address book data, the method further comprises:
    applying a machine learning classifier to the received contact in the received address book data to determine a probability that the received contact in the received address book data and one of the two or more contacts in the stored address book data are the same contact; and
    determining that the received contact in the received address book data and the one of the two or more contacts in the stored address book data are the same contact when the probability equals or exceeds a threshold value.

3. The method of claim 1, wherein the merged contact is merged by a method comprising clustering the received contact in the received address book data and the only one contact in the stored address book by applying a clustering algorithm which uses a distance function to group the received contact in the received address book data and the only one contact in the stored address book based on a distance between the received contact in the received address book data and the only one contact in the stored address book.

4. The method of claim 1, wherein the only one contact associated with the contact identifier is identifiable from the stored address book data is determined by:
    selecting the only one contact from among a plurality of contacts in the received address book data;
    generating a list of candidate contacts from among a plurality of contacts in the stored address book data; and
    comparing the only one contact with the candidate contacts.

5. The method of claim 4, wherein the comparing comprises:
    matching a name in the only one contact to a name in at least one of the candidate contacts;
    matching a source and an ID associated with the only one contact to a source and an ID associated with at least one of the candidate contacts; and/or
    matching an origin and an ID associated with the only one contact to an origin and an ID associated with at least one of the candidate contacts.

6. The method of claim 1, wherein:
    the stored address book data further comprises at least one confidence value for each contact in the stored address book data; and
    when the two or more contacts associated with the contact identifier are identifiable from the stored address book data, selecting one of the two or more having a highest confidence value as the same contact as the received contact in the received address book data.

7. The method of claim 1, further comprising:
    identifying information associated with the only one contact from a public data source by searching the public data source for information related to a contact in the received address book data;
    adding the identified information to the retrieved address book data when the information related to the received contact in the received address book data is found; and
    storing the address book data with the added information in the database.

8. The method of claim 7, wherein the public data source is at least one of stored in the database, comprises directory data, or comprises crowdsourced data.

9. The method of claim 7, wherein the adding comprises clustering the found information and the contact in the stored address book by applying a clustering algorithm which uses a distance function to group the found information and the contact in the stored address book based on a distance between the found information and the contact in the stored address book.

10. The method of claim 1, wherein the one of the two or more contacts having a highest confidence value is selected by a method comprising:
    clustering two or more separate groups of the two or more contacts by applying a clustering algorithm which uses a distance function to group the two or more contacts with one another based on a distance between the two or more contacts; and selecting one of the two or more separate groups.

11. A system comprising:
a memory comprising instructions; and
one or more processors configured to execute the instructions to:
receive address book data comprising a received contact associated with a contact identifier;
retrieve, from a database, stored address book data comprising information associated with the received contact;
when only one contact associated with the contact identifier is identifiable from the stored address book data, then add a merged contact comprising the received contact and the only one contact to the stored address book data in the database, and send, to a communication device, at least some of the added information for the merged contact; and
when two or more contacts associated with the contact identifier are identifiable from the stored address book data, then send, to the communication device via a network, at least some of the information associated with one of the two or more contacts having a highest confidence value,
wherein when a respective contact was created by a user or imported from an external source, the confidence value for the respective contact is generated based on whether the contact was created by the user, or imported from the external source.

12. The system of claim 11, wherein when the two or more contacts associated with the contact identifier are identifiable from the stored address book data, the processor is configured to:
apply a machine learning classifier to the received contact in the received address book data to determine a probability that the received contact in the received address book data and one of the two or more contacts in the stored address book data are the same contact; and
determine that the received contact in the received address book data and one of the two or more contacts in the stored address book data are the same contact when the probability equals or exceeds a threshold value.

13. The system of claim 11, wherein the merged contact is merged by a method comprising clustering the received contact in the received address book and the only one contact in the stored address book by applying a clustering algorithm which uses a distance function to group the received contact in the received address book and the only one contact in the stored address book based on a distance between the received contact in the received address book and the only one contact in the stored address book.

14. The system of claim 11, wherein the only one contact associated with the contact identifier is identifiable from the stored address book data is determined by the processor being configured to:
select the only one contact from among a plurality of contacts in the received address book data;
generate a list of candidate contacts from among a plurality of contacts in the stored address book data; and
compare the only one contact with the candidate contacts.

15. The system of claim 14, wherein the processor is configured to compare the selected contact with the candidate contacts by:

matching a name in the only one contact to a name in at least one of the candidate contacts;
matching a source and an ID associated with the selected contact to a source and an ID associated with at least one of the candidate contacts; and/or
matching an origin and an ID associated with the selected contact to an origin and an ID associated with at least one of the candidate contacts.

16. The system of claim 11, wherein:
the stored address book data further comprises at least one confidence value for each contact in the stored address book data; and
when the two or more contacts associated with the contact identifier are identifiable from the stored address book data, the processor is further configured to select one of the two or more contacts having a highest confidence value as the same contact as the received contact in the received address book data.

17. The system of claim 11, wherein the processor is further configured to:
identify information associated with the only one contact in from a public data source by searching the public data source for information related to a contact in the received address book data; and
add the identified information to the retrieved address book data when the information related to the received contact in the received address book data is found; and
store the address book data with the added information in the database.

18. The system of claim 11, wherein the one or more processors is configured to add the identified information by clustering the found information and the contact in the stored address book by applying a clustering algorithm which uses a distance function to group the found information and the contact in the stored address book based on a distance between the found information and the contact in the stored address book.

19. The system of claim 11, wherein the one or more processors is configured to select the one of the two or more contacts having a highest confidence value by:
clustering two or more separate groups of the two or more contacts by applying a clustering algorithm which uses a distance function to group the two or more contacts with one another based on a distance between the two or more contacts; and
selecting one of the two or more separate groups.

20. A non-transitory machine-readable storage medium comprising machine-readable instructions for causing a processor to execute a method comprising:
receiving, by a server from a communication device, address book data comprising a received contact associated with a contact identifier;
retrieving, from a database, stored address book data comprising information associated with the received contact;
when only one contact associated with the contact identifier is identifiable from the stored address book data, then adding a merged contact comprising the received contact and the only one contact to the stored address book data, and sending, by the server to the communication device, at least some information for the merged contact; and
when two or more contacts associated with the contact identifier are identifiable from the stored address book data, then sending, by the server to the communication device, at least some of the information associated with one of the two or more contacts having a highest confidence value, wherein when a respective contact was created by a user or imported from an external source, the confidence value for the respective contact is generated based on whether the contact was created by the user, or imported from the external source.

\* \* \* \* \*